March 13, 1951 J. WICKS 2,544,944
RESTRICTED SERVICE AUTOMATIC TELEPHONE SYSTEM
Filed June 3, 1947
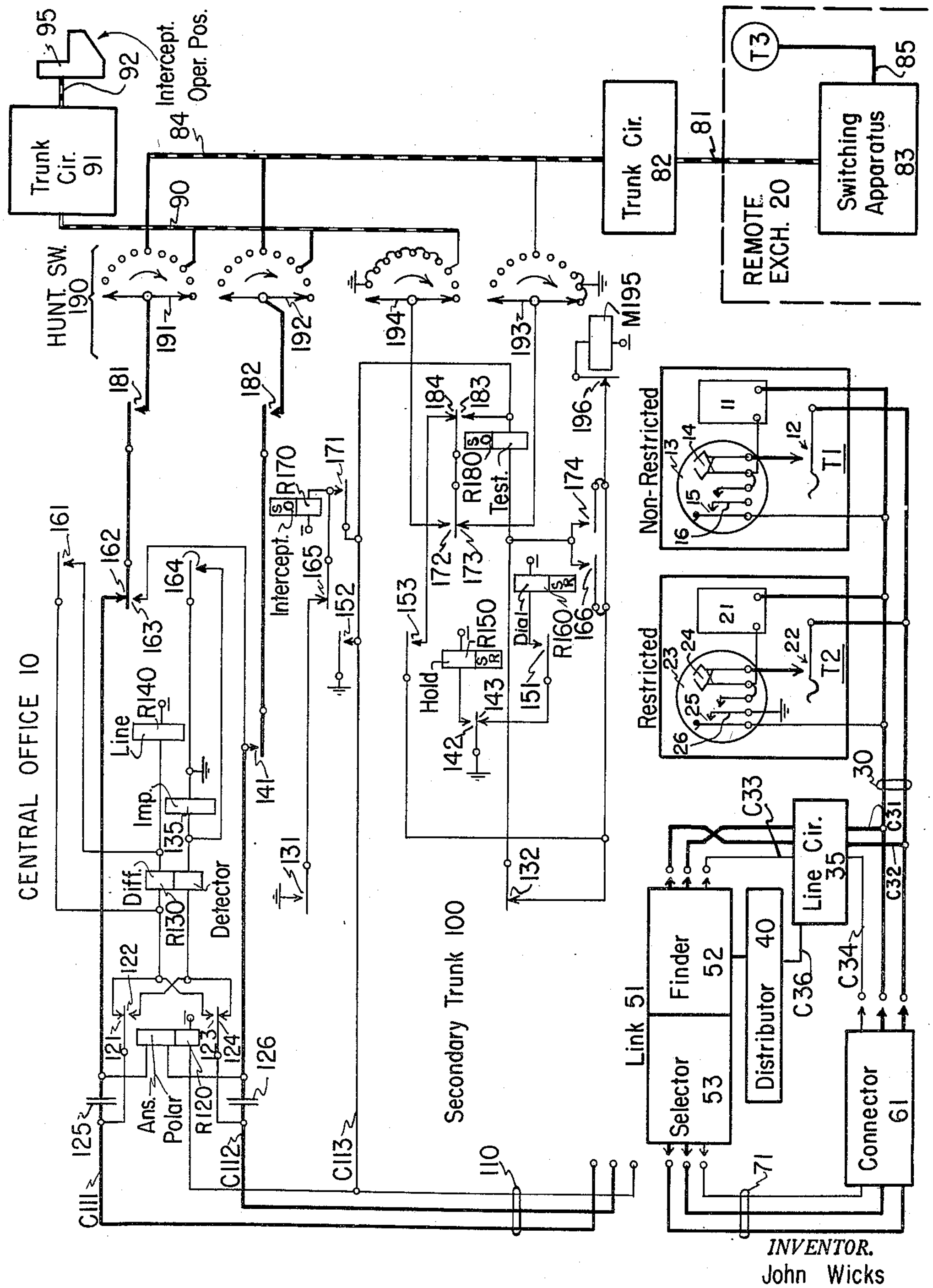
*INVENTOR.*
John Wicks
*BY*
*Smith, Olsen & Baird*
Attorneys Patented Mar. 13, 1951

2,544,944

UNITED STATES PATENT OFFICE 2,544,944

RESTRICTED SERVICE AUTOMATIC TELEPHONE SYSTEM

John Wicks, Biloxi, Miss., assignor to Automatic Electric Laboratories, Inc., Chicago, Ill., a corporation of Delaware Application June 3, 1947, Serial No. 752,055

8 Claims. (Cl. 179—18)

The present invention relates to automatic telephone systems and more particularly to such systems in which different groups of subscriber substations are rendered corresponding different classes of service.

In an automatic telephone system serving a central office area and the adjacent suburban areas, calls from the subscriber substations in the central office area that are to be completed to subscriber substations in the suburban areas are usually first extended to an operator switchboard in the central office area and then routed by the operators thereat to the subscriber substations in the suburban areas. While this system is entirely satisfactory in operation, a large switchboard in the central office, staffed by a great number of operators, is required in order to complete the calls from the central office area to the suburban areas.

Accordingly, it is an object of the present invention to provide an automatic telephone system comprising an improved switching arrangement; whereby subscriber substations of a first class in the central office are rendered a corresponding class of service permitting them to set up connections to subscriber substations in the suburban areas, and subscriber substations of a second class in the central office are rendered a corresponding class of service preventing them from setting up connections to subscriber substations in the suburban areas.

Another object of the invention is to provide an automatic telephone system of the character described; wherein the first and second classes of service mentioned are rendered to the corresponding classes of subscriber substations regardless of whether the subscriber substations are connected to individual or party lines.

Another object of the invention is to provide an automatic telephone system of the character described that includes subscriber substations of first and second classes that are connected to the same party line and rendered corresponding first and second classes of service.

A further object of the invention is to provide an automatic telephone system in which different classes of service are rendered to subscriber substations; wherein the classes of service are selectively established by an improved arrangement including apparatus provided at the subscriber substations.

A further object of the invention is to provide an automatic telephone system in which different classes of service are rendered to subscriber substations; wherein the classes of service are selectively established by an improved arrangement including different types of digit transmitting mechanism provided at the subscriber substations.

A still further object of the invention is to provide in a telephone system including a first exchange provided with subscriber substations of first and second classes and automatic switching apparatus accessible thereto; an improved arrangement whereby the switching apparatus is controlled when a trunk call is initiated to select an idle trunk extending to another exchange, and whereby the switching apparatus is reoperated to release the selected trunk and to route the call to an interceptor operator position in the event a subsequent control performed at the calling subscriber substation indicates that it is of the second class that is not entitled to make such a trunk call.

Further features of the invention pertain to the particular arrangement of the circuit elements of the system whereby the above outlined and additional operating features thereof are attained.

The invention both as to its organization and method of operation, together with further objects and advantages thereof, will best be understood by reference to the following specification taken in connection with the accompanying drawing in which the single figure illustrates the details of an automatic telephone system having incorporated therein the features of the present invention.

Referring now more particularly to the drawing, there is illustrated an automatic telephone system comprising a central office 10 and a remote exchange 20. The central office 10 is connected to the remote exchange 20 by a group of seven trunk lines, including the trunk line 81.

The central office 10 may serve a group of several hundred subscriber lines, rendered two individual classes of service including non-restricted service and restricted service; and comprising both private or individual lines and party lines. A first group of these subscriber lines includes the partly line 30 having the subscriber substations T1 and T2 connected thereto, and respectively rendered non-restricted and restricted services. Each subscriber substation rendered non-restricted service is provided with conventional substation apparatus; while each subscriber substation rendered restrictive service is provided with substation apparatus including a unique dial or digit transmitting mechanism. For example, the subscriber substation T1 rendered non-restricted service is provided with substation apparatus including a telephone instrument 11, a hook-switch 12, and a dial 13; the dial 13 including a pair of impulsing springs 14 and a pair of off-normal springs 15. Similarly the subscriber substation T2 rendered restricted service is provided with substation apparatus including a telephone instrument 21, a hook switch 22, and a dial 23; the dial 23 including a pair of impulsing springs 24 and a pair of off-normal springs 25, one of which is connected to ground potential at the subscriber substation T2. Each subscriber line is provided with a line circuit individual thereto; the line circuit 35 being individual to the party line 30. Further, the central office 10 comprises a plurality of groups of links each serving a group of one-hundred of the subscriber lines; the first group of links, including the link 51, serves the first group of one-hundred subscriber lines, including the party line 30 extending to the subscriber substations T1 and T2. The first group of links, including the link 51, is provided with an associated distributor 40 individual thereto; and each link comprises a finder and a selector, the link 51 comprising the finder 52 and the selector 53. Also the central office 10 comprises a plurality of groups of connectors each serving a group of one-hundred of the subscriber lines; the first group of connectors, including the connector 61, serves the first group of one-hundred subscriber lines, including the party line 30 extending to the subscriber substations T1 and T2.

Also the central office 10 comprises a group of trunk circuits terminating the trunk lines in the group extending to the remote exchange 20, the trunk circuit 82 terminating the trunk line 81; and an interceptor operator position 95. The interceptor operator position 95 terminates a group of three trunks, including the trunk 92, terminated by another group of trunk circuits, including the trunk circuit 91, the trunk 92 being terminated by the trunk circuit 91. Also, the central office 10 comprises a group of secondary trunks, including the secondary trunk 100. Each of the secondary trunks in the group, including the secondary trunk 100, is provided with an incoming trunk accessible to the selectors of the links in the different groups, the secondary trunk 100 being provided with the incoming trunk 110 accessible to the selector 53 of the link 51 in the first group. Each of the trunk circuits in the group, including the trunk circuit 82, is provided with an incoming trunk accessible to the hunt switches incorporated in the secondary trunks 100, etc.; the trunk circuit 82 being provided with the incoming trunk 84 accessible to the hunt switch 190 incorporated in the secondary trunk 100. Each of the trunk circuits in the group, including the trunk circuit 91, is provided with an incoming trunk accessible to the hunt switches incorporated in the secondary trunks 100, etc.; the trunk circuit 91 being provided with the incoming trunk 90 accessible to the hunt switch 190 incorporated in the secondary trunk 100.

The remote exchange 20 serves a group of subscriber substations, including the subscriber substation T3; and comprises automatic switching apparatus 83 of the Strowger type terminating the trunk lines 81, etc., and having access to the subscriber lines 85, etc., respectively extending to the subscriber substation T3, etc. Also the switching apparatus 83 is accessible to the subscriber substation T3, etc. via the subscriber lines 85, etc.

Preferably in the central office 10, each of the links is identical to the link 51 which comprises the finder 52 and the selector 53, of the Strowger types. The finder 52 has access to the first group of one-hundred subscriber lines, including the party line 30; while the selector 53 has access to the different groups of connectors, including the connector 61 in the first group; and also access to the group of secondary trunks 100, etc. The connector 61 is accessible to the selector 53 by way of the associated incoming trunk 71; and the secondary trunk 100 is accessible to the selector 53 by way of the associated incoming trunk 110.

Preferably, each of the secondary trunks is identical to the secondary trunk 100; which comprises a relay group, including an answer relay R120, a detector relay R130, a line relay R140, a hold relay R150, a dial relay R160, an intercept relay R170 and a test relay R180; as well as the hunt switch 190. The hunt switch 190 is of the rotary type, including four wipers 191 to 194, inclusively, provided with individually associated contact banks, and a magnet M195 for driving the wipers noted step by step in the clockwise direction.

A better understanding of the connection and arrangement of the telephone system will be facilitated from the following description of the operation of the apparatus incorporated therein incident to the extension of various connections from the subscriber substations in the central office 10.

*Local calls in the central office 10*

First assuming that a call is initiated at any subscriber substation in the central office 10, such, for example as the subscriber substation T1, rendered non-restricted service; when the call is initiated at the subscriber substation T1 by the removal of the telephone instrument 11 thereat from its associated switch hook, the hookswitch 12 is closed, completing an obvious connection including the impulsing springs 14 of the dial 13, across the line conductors C31 and C32 of the party line 30. The line circuit 35 is controlled over the party line 30 to apply ground potential to the start conductor C36 extending to the associated distributor 40; whereby the distributor 40 operates in order to assign an idle one of the links in the first group to the calling party line 30, such, for example, as the link 51. Also the line circuit 35 marks, by the application of battery potential upon the control conductor C33 of the party line 30, the position thereof before the finder 52; and marks, by the application of ground potential to the control conductor C34, the party line 30 as busy to the connectors in the first group including the connector 61 having access thereto. The finder 52 of the link 51 is controlled by the distributor 40 to find the party line 30; whereupon the subscriber at the calling subscriber substation T1 receives dial tone, and then proceeds to dial the first digit of the directory number of the called subscriber substation. The selector 53 responds to the first digit mentioned to select the indicated group of connectors and then an idle connector therein. For example, the selector 53 may select the particular connector 61 by way of the associated incoming trunk 71; whereby the operation of the connector 61 is placed under the control of the subscriber at the calling subscriber substation T1. The subscriber at the calling subscriber substation T1 then proceeds to dial the second and third digits of the directory number of the called subscriber substation; whereby the connector 61 operates to select the subscriber line extending to the called subscriber substation and proceeds to test the idle or busy condition thereof; all in a conventional manner. Further operation of the connector is entirely conventional; and subsequently the release of the established connection to the called subscriber substation is brought about when the subscriber at the calling subscriber substation T1 replaces the receiver of the telephone instrument 11 upon its associated switch hook.

In passing it is noted that each time the subscriber at the calling subscriber substation T1 operates the dial 13, the off-normal switch springs 15 therein are actuated into engagement, thereby to complete a path for short-circuiting the telephone instrument 11 in a conventional manner. When the finger wheel of the dial 13 is then released, the impulsing springs 14 thereof, operate to transmit over the party line 30 the impulses of the corresponding digit; and when all of the impulses of the digit have been transmitted, the set of off-normal springs 15 in the dial 13 are again actuated into open-circuit relation, interrupting the previously mentioned path for short-circuiting the telephone instrument 11, in a conventional manner. It is noted that the set of off-normal springs 15 includes the spring 16 which is connected to no-potential, whereby no unique control is brought about over the party line 30 incident to operation of the dial 13.

In view of the foregoing description of the extension of a local call from the subscriber substation T1 rendered non-restricted service, it will be understood that a local call is initiated and extended in an identical manner from a subscriber substation rendered restricted service, such for example, as the subscriber substation T2. In passing it is noted that each time the dial 23 at the calling subscriber substation T2 is operated, the off-normal springs 25 therein are actuated into engagement, thereby to complete a path for short-circuiting the telephone instrument 21, in a conventional manner. Also, each time the set of off-normal springs 25 is thus operated, the spring 26 connected to ground potential is included in the path mentioned; whereby ground potential is applied to both of the line conductors C31 and C32 of the party line 30. This application of ground potential to the line conductors mentioned of the party line 30 has no effect in the associated selector 53, etc., and in the connected connector 61, etc. Accordingly, the selector 53, etc. and the connector 61, etc. respond to the appropriate digits dialed at the calling subscriber substation T2 in order to extend the local call to the called subscriber substation in the manner previously explained.

*Trunk calls from the central office 10 to the remote exchange 20*

First assume that a call has been initiated at the subscriber substation T1 rendered non-restricted service in the central office 10; that the finder 52 of the link 51 has operated to find the party line 30 extending to the subscriber substation T1; that the selector 53 of the link 51 is conditioned to be responsive to the first digit dialed at the calling subscriber substation T1; and that the call is to be extended to a called subscriber substation, such for example, as the subscriber substation T3 in the remote exchange 20. The subscriber at the calling subscriber substation T1 proceeds to dial the first digit of the directory number of the called subscriber substation T3 in the remote exchange 20; thereby to cause operation of the selector 53 in order to select an idle secondary trunk in the associated group. For example, the selector 53 may select the trunk 110 extending to the secondary trunk 100, the trunk 110 being marked as idle thereto by the application of battery potential by way of the lower winding of the answer relay R120 to the control conductor C113 of the trunk 110. When the selector 53 seizes the trunk 110, the loop circuit from the calling subscriber substation T1 is extended to the line conductors C111 and C112 of the trunk 110 and by way of the contacts 121 and 124, the upper and lower windings of the detector relay R130, the winding of the line relay R140 and the impedance element 135 respectively to battery and ground potentials. When this loop circuit is thus completed the line relay R140 operates; however, the detector relay R130 does not operate as of the differential type. Upon operating, the line relay R140 completes, at the contacts 142, an obvious circuit for operating the hold relay R150. Upon operating the hold relay R150 completes, at the contacts 152, an obvious path for applying ground potential to the control conductor C113 of the trunk 110, thereby to retain the link 51 in its operated position and to mark the trunk 110 as busy to the other selectors having access thereto.

Also the hold relay R150 completes, at the contacts 153, a path, including the contacts 196, 184 and 173, for applying battery potential by way of the magnet M195 of the hunt switch 190 to the wiper 193 thereof. The wipers noted of the hunt switch 190 occupy their last operated position at this time; and assuming that the wipers noted of the hunt switch 190 occupy the positions illustrated, ground potential appears upon the wiper 193 by virtue of the grounded condition of the engaged contact in the associated contact bank. Accordingly the magnet M195 operates to interrupt, at the contacts 196, the above traced operating circuit therefor. The magnet M195 then restores in order to recomplete, at the contacts 196, the previously traced path for applying battery potential by way of the magnet M195 to the wiper 193. Also upon operating and then restoring, the magnet M195 drives the wipers noted of the hunt switch 190 an additional step in the clockwise direction; whereby the wiper 193 engages the contact in the associated contact bank terminating the control conductor of the first trunk line extending between the central office 10 and the remote exchange 20. Further operation of the magnet M195 depends upon the idle or busy condition of the first trunk line mentioned extending between the central office 10 and the remote exchange 20; and assuming that all of the trunk lines extending between the central office 10 and the remote exchange 20 and preceding the trunk line 81 are busy at this time, the magnet M195 operates buzzer-fashion in order to drive the wipers noted of the hunt switch 190 step by step in the clockwise direction and into engagement with the contacts in the associated contact banks terminating the incoming trunk 84 etxending to the trunk circuit 82 that, in turn, terminates the trunk line 81 extending between the central office 10 and the remote exchange 20.

When the wipers noted of the hunt switch 190 engage the contacts in the associated contact banks terminating the incoming trunk 84, further operation of the hunt switch 190 is arrested since battery potential in the trunk circuit 82 is applied to the control conductor of the incoming trunk 84 and consequently to the wiper 193 of the hunt switch 190, completing a path substantially identical to that previously traced for short-circuiting the magnet M195. Also at this time, a circuit, including the contacts 152, 132 and 196, is completed for energizing the winding of the test relay 180 in series with the magnet M195; whereby the test relay R180 operates shortly thereafter, it being of the slow-to-operate type. However, the magnet M195 does not operate due to the high series resistance of the winding of the test relay R180. Upon operating, the test relay R180 interrupts, at the contacts 184, the previously traced connection between the magnet M195 and the wiper 193 of the hunt switch 190; and completes, at the contacts 183, a path, including the contacts 152 and 173, for applying direct ground potential to the wiper 193, and consequently to the control conductor of the incoming trunk 84. Also the test relay R180 completes, at the contacts 181 and 182, a path including the contacts 162 and 141 for bridging the upper winding of the answer relay R120 across the line wipers 191 and 192 of the hunt switch 190, and consequently across the line conductors of the incoming trunk 84; whereby the trunk circuit 82 is seized. Also the application of ground potential upon the control conductor of the incoming trunk 84 is effective to mark the trunk line 81 as busy to the hunt switches in the other secondary trunks having access thereto. When the above traced loop circuit between the upper winding of the answer relay R120 and the trunk circuit 82 is thus completed, the answer relay R120 does not operate since it is poled to operate incident to the reversal of potential over the loop circuit mentioned as explained more fully hereinafter. Accordingly at this time, the hunt switch 190 incorporated in the secondary trunk 100 has operated automatically to seize the idle incoming trunk 84 extending to the trunk circuit 82, terminating the trunk line 81 extending between the central office 10 and the remote exchange 20, when the selector 53 operated to seize the incoming trunk 110 extending to the secondary trunk 100. Also at this time, the trunk circuit 82 operates to control over the trunk line 81 the switching apparatus 83 in the remote exchange 20; whereby the switching apparatus 83 is conditioned to respond to a digit transmitted over the trunk line 81.

At this time, the subscriber at the calling subscriber substation T1 proceeds to dial the second digit of the directory number of the called subscriber substation T3 in the remote exchange 20; whereby the impulses of the second digit are transmitted from the dial 13 at the calling subscriber substation T1 over the previously traced loop circuit, including the link 51 to the line relay R140 in the secondary trunk 100; whereby the line relay R140 follows. The first time the line relay R140 restores it completes, at the contacts 143, a circuit, including the contacts 151, for operating the dial relay R160. Upon operating the dial relay R160 completes, at the contacts 166, a multiple point around the contacts 132 of the detector relay R130, in the previously traced circuit for maintaining operated the test relay R180. Also the dial relay R160 interrupts, at the contacts 162, the previously traced path for bridging the upper winding of the answer relay R120 across the line conductors of the incoming trunk 84; and prepares, at the contacts 163, an alternative dialing bridge traced hereinafter across the line conductors of the incoming trunk 84. Further, the dial relay R160 completes, at the contacts 161, an obvious path for short-circuiting the upper winding of the detector relay R130; and completes, at the contacts 164, an obvious path for short-circuiting the impedance element 135; thereby to improve the dialing circuit extending between the calling subscriber substation T1 and the line relay R140. Finally, the dial relay R160 interrupts, at the contacts 165, a further point in a circuit traced hereinafter for operating the intercept relay R170. Thereafter each time the line relay R140 restores and then reoperates it interrupts and then recompletes, at the contacts 142, the previously mentioned circuit for maintaining operated the hold relay R150; whereby the latter relay is retained in its operated position during impulsing since it is of the slow-to-release type. Also each time the line relay R140 restores and then reoperates it completes and then interrupts, at the contacts 143, the previously traced circuit for maintaining operated the dial relay R160; whereby the latter relay is retained in its operated position during impulsing since it is of the slow-to-release type. Finally each time the line relay R140 restores and then reoperates it interrupts and then recompletes, at the contacts 141, the previously mentioned dialing bridge, including the contacts 163, 181, and 182 and the wipers 191 and 192 of the hunt switch 190, across the line conductors of the incoming trunk 84; whereby the impulses of the second digit are repeated by the line relay R140, at the contacts 141, over the line conductors of the incoming trunk 84 to the trunk circuit 82; which digit is repeated by the trunk circuit 82 over the trunk line 81 to the switching apparatus 83 in the remote exchange 20 in order to cause corresponding operation thereof. In passing, it is noted that each time the above traced loop circuit between the line relay R140 and the calling subscriber substation T1 is completed at the impulsing springs 14 of the dial 13, that the lower winding of the detector relay R130 is energized; the upper winding of the detector relay R130 being short-circuited at this time; whereby the detector relay R130 operates and restores intermittently. This intermittent operation of the detector relay R130 is without effect at this time since the operated dial relay R160 retains interrupted, at the contacts 165, a circuit traced hereinafter for operating the intercept relay R170.

At the conclusion of the second digit dialed at the calling subscriber substation T1, the line relay R140 is retained in its operated position, maintaining interrupted, at the contacts 143, the previously traced circuit for maintaining operated the dial relay R160; whereby the latter relay restores shortly thereafter, it being of the slow-to-release type. Upon restoring the dial relay R160 interrupts, at the contacts 161, the previously mentioned path for short-circuiting the upper winding of the detector relay R130; thereby to cause the latter relay to restore since both the upper and lower windings thereof are now energized and it is of the differential type. Also the dial relay R160 interrupts, at the contacts 164, the previously mentioned path for short-circuiting the impedance element 135; and interrupts, at the contacts 166, the previously mentioned point in multiple to the contacts 132 of the restored detector relay R130. Also the dial relay R160 reprepares, at the contacts 165, a further point in the previously mentioned circuit for operating the intercept relay R170; and interrupts, at the contacts 163, the previously traced dialing bridge across the line conductors of the incoming trunk 84; and recompletes, at the contacts 162, the previously traced original loop circuit including the upper winding of the answer relay R120 across the line conductor of the incoming trunk 84.

In a similar manner the third and subsequent digits of the directory number of the called subscriber substation T3 in the remote exchange 20 are dialed at the calling subscriber substation T1 in the central office 10 and repeated by the secondary trunk 100 to the trunk circuit 82, and therefrom over the trunk line 81 to the switching apparatus 83 in the remote exchange 20 in order to bring about operation of the switching apparatus 83 to select the subscriber line 85 extending to the called subscriber substation T3. The subsequent operation of the switching apparatus 83 depends upon the idle or busy condition of the called subscriber substation T3, in a conventional manner; and assuming that the called subscriber substation T3 is idle at this time, when the call is answered thereat, the switching apparatus 83 effects the reversal of polarity over the trunk line 81; whereby the trunk circuit 82 effects reversal of polarity over the incoming trunk 84. When the polarity of the incoming trunk 84 is thus reversed, the upper winding of the answer relay R120 is poled to operate. Upon operating the answer relay R120 reverses, at the contacts 121, 122, 123, 124, the polarity of the loop circuit extending between the calling substation T1 and the line relay R140; which reversal of polarity over the loop circuit mentioned may be employed for metering purposes in a conventional manner. The established connection between the calling subscriber substation T1 in the central office 10 and the called subscriber substation T3 in the remote exchange 20 persists for any desired time interval at the convenience of the subscribers at the substations mentioned.

At the conclusion of the connection when the subscriber at the called subscriber substation T3 in the remote exchange 20 replaces the receiver of the elephone instrument thereat upon its associated switchhook, the switching apparatus 83 is controlled in order to bring about the reversal of polarity over the trunk line 81; whereby the trunk circuit 82 effects the reversal of polarity over the incoming trunk 84, in order to cause the answer relay R120 to restore. Upon restoring the answer relay R120 again effects the reversal of polarity, at the contacts 121, 122, 123, 124, over the loop circuit extending between the calling subscriber substation T1 and the line relay R140. When the subscriber at the calling subscriber substation T1 in the central office 10 replaces the receiver of the telephone instrument 11 thereat upon its associated switchhook, the previously traced loop circuit extending therefrom to the line relay R140 is interrupted in order to effect the restoration of the line relay R140. Upon restoring the line relay R140 interrupts, at the contacts 142, the previously mentioned circuit for maintaining operated the hold relay R150; whereby the latter relay restores shortly thereafter it being of the slow-to-release type. Upon restoring the hold relay R150 interrupts, at the contacts 152, the previously mentioned path for applying ground potential to the control conductor C113 of the trunk 110 and the previously traced path for applying ground potential by way of the wiper 193 of the hunt switch 190 to the control conductor of the incoming trunk 84; when ground potential is thus removed from the control conductor C113 of the trunk 110, both the finder 52 and the selector 53 of the link 51 are released; and battery potential by way of the lower winding of the answer relay R120 is applied to the control conductor C113 of the trunk 110; thereby to mark the trunk 110 as idle to the selectors of the various links having access thereto. When ground potential is removed from the control conductor of the incoming trunk 84, the trunk circuit 82 is released in order to bring about the release of the switching apparatus 83 connected thereto by the trunk line 81; whereby the subscriber line 85 extending to the called subscriber substation T3 is again marked as idle to the switching apparatus 83. When the finder 52 of the link 51 is released in the manner explained above, the line circuit 35 individual to the party line 30 is controlled in order to remove the application of ground potential upon the control conductor C34 thereof and to reapply battery potential to the control conductor C34; whereby the party line 30 is marked as idle to the connectors 61, etc. in the first group having access thereto. Also when ground potential is removed from the control conductor C113 of the trunk 110, the previously traced holding circuit for maintaining operated the test relay R180, is interrupted, whereby the latter relay restores. At this time, the secondary trunk 100 is completely released; and all of the apparatus utilized in the established connection between the calling subscriber substation T1 in the central office 10 and the calling subscriber substation T3 in the remote exchange 20 is completely released and is available for further use.

Now assume that a call has been initiated at the subscriber substation T2 rendered restricted service in the central office 10; that the finder 52 of the link 51 has operated to find the party line 30 extending to the subscriber substation T2; that the selector 53 of the link 51 is conditioned to be responsive to the first digit dialed at the calling subscriber substation T2; and that the subscriber at the calling subscriber substation T2 attempts the extension of a connection to a called subscriber substation in the remote exchange 20. The subscriber at the calling subscriber substation T2 proceeds to dial the first digit of the directory number of the called subscriber substation in the remote exchange 20; thereby to bring about operation of the selector 53 to select an idle trunk in the group, including the trunk 110, in the manner previously explained. Assuming that the selector 53 seizes the particular trunk 110, the line relay R140 and the hold relay R150 in the secondary trunk 100 are operated; whereby operation of the hunt switch 190 is initiated; all in the manner previously explained. More particularly, the hunt switch 190 operates to select an idle trunk extending between the central office 10 and the remote exchange 20; and it may be assumed that the hunt switch 190 selects the incoming trunk 84 extending to the trunk circuit 82; whereby the switching apparatus 83 in the remote exchange 20 is controlled over the trunk line 81 in order to be conditioned to be responsive to the second digit of the directory number of the called subscriber substation in the remote exchange 20; all in the manner previously explained. At this time, the test relay R180 in the secondary trunk 100 is operated and the secondary trunk 100 is conditioned to repeat the second digit of the directory number dialed at the calling subscriber substation T2, in the manner previously explained.

However, in the present example, when the subscriber at the calling subscriber substation T2 operates the finger wheel of the dial 23 in preparing it to transmit the second digit of the directory number of the called subscriber substation in the remote exchange 20, the set of off-normal springs 25 therein are actuated into engagement; thereby to cause ground potential to be applied to the line conductors C31 and C32 of the party line, and consequently to the line conductors C111 and C112 of the trunk 110. This application of ground potential to the line conductor C111 of the trunk 110 completes an obvious alternating circuit for energizing in series the upper winding of the detector relay R130 and the winding of the line relay R140; while this application of ground potential to the line conductor C112 of the trunk 110 completes an obvious path for short-circuiting in series the lower winding of the detector relay R130 and the impedance element 135. Accordingly, the upper winding of the detector relay R130 is energized and the lower winding thereof is short-circuited; whereby the detector relay R130 operates since it is of the differential type. Upon operating the detector relay R130 completes, at the contacts 131, the previously mentioned circuit, including the contacts 165, for energizing the winding of the intercept relay R170; whereby the latter relay operates shortly thereafter, it being of the slow-to-operate type. Also upon operating the detector relay R130 interrupts, at the contacts 132, the previously traced holding circuit for energizing the winding of the test relay R180 in series with the magnet M195; thereby to cause the latter relay to restore. Upon restoring the test relay R180 interrupts, at the contacts 181 and 182, the previously traced loop circuit extending between the upper winding of the answer relay R120 and the line conductors of the incoming trunk 84; thereby to effect the release of the trunk circuit 82 and the consequent release of the switching apparatus 83 in the remote exchange 20. When the intercept relay R170 operates, as previously noted, it completes, at the contacts 171, a holding circuit therefor, including the contacts 152; and interrupts, at the contacts 173, a further point in the previously traced path for applying battery potential by way of the magnet M195 to the wiper 193 of the hunt switch 190. Also the intercept relay R170 completes, at the contacts 172, a path, including the contacts 184, 153 and 196, for applying battery potential by way of the magnet M195 to the wiper 194 of the hunt switch 190; which wiper 194 engages a grounded contact in the associated contact bank by virtue of the position of the wipers noted of the hunt switch 190 at this time. Accordingly, the magnet M195 operates buzzer-fashion in order to drive the wipers noted of the hunt switch 190 across the contacts in the associated contact banks terminating the remainder of the incoming trunks extending to trunk circuits terminating trunk lines extending between the central office 10 and the remote exchange 20. When the wiper 194 of the hunt switch 190 is driven to disengage the last ground contact in the associated contact bank and to engage the adjacent contact terminating the control conductor of the first incoming trunk in the group of three trunks extending to the interceptor operator position 95, the incoming trunk mentioned is tested in order to determine the idle or busy condition thereof. Assuming that the first trunk 92 in the group mentioned is idle at this time, battery potential in the trunk circuit 91 connected thereto appears upon the control conductor of the incoming trunk 90; thereby to complete a path substantially identical to that previously traced for short-circuiting the magnet M195. Accordingly at this time, an alternative circuit, including the contacts 152, 174 and 196, is completed for energizing the winding of the test relay R180 in series with the magnet M195; whereby the test relay R180 operates shortly thereafter, it being of the slow-to-operate type. However, the magnet M195 does not operate due to the high series resistance of the winding of the test relay R180. Upon operating the test relay R180 interrupts, at the contact 184, the previously traced path for applying battery potential by way of the magnet M195 to the wiper 194; and completes, at the contacts 183 a path, including the contacts 152 and 172, for applying ground potential directly to the wiper 194; further the test relay R180 completes, at the contacts 181 and 182, a loop circuit substantially identical to that previously traced between the upper winding of the answer relay R120 and the line conductors of the incoming trunk 90 extending to the trunk circuit 91. When the hunt switch 190 is thus operated to seize the incoming trunk 90 extending to the trunk circuit 91, the trunk circuit 91 operates to transmit over the trunk 92 a call signal to the interceptor operator position 95; thereby to indicate to the operator thereat that a call is waiting to be answered on the trunk 92.

Subsequently, when the subscriber at the calling subscriber substation T2 releases the finger wheel of the dial 23, the second digit of the directory number of the called subscriber substation in the remote exchange 20 is transmitted thereby to the line relay R140; and repeated by the line relay R140 over the incoming trunk 90 to the trunk circuit 91; which operations are without effect at this time. During the reception of the impulses of the second digit mentioned, the dial relay R160 again operates; and at the conclusion of the second digit mentioned, the dial relay R160 restores shortly thereafter, bringing about the restoration of the detector relay R130. The operator at the interceptor position 95 then answers the call on the trunk 92 completing a loop circuit extending therefrom by way of the trunk 92, the trunk circuit 91 and the incoming trunk 90 to the upper winding of the answer relay R120 in the secondary trunk 100; whereby the upper winding on the answer relay R120 is not poled to operate since the call has been extended to the interceptor operator position 95. Accordingly, at this time, a connection has been completed between the calling subscriber substation T2 and the interceptor operator position 95 in the central office 10; and when the subscriber at the calling subscriber substation T2 completes the dialing of all of the digits of the directory number of the called subscriber substation in the remote exchange 20, the operator at the interceptor position 95 converses with the subscriber at the calling subscriber substation T2, advising him that he is not permitted to make calls directly to the remote exchange 20 since the subscriber substation T2 is rendered restricted service. The operator at the interceptor position 95 may undertake the extension of the connection to the desired called subscriber substation in the remote exchange 20, or she may advise the subscriber at the calling subscriber substation T2 to dial the regular tollboard, not shown, after releasing the present connection. The release of the established connection between the calling subscriber substation T2 and the interceptor operator position 95 takes place in a conventional manner when the subscriber at the calling subscriber substation T2 replaces the receiver of the telephone instrument 21 thereat upon its associated switchhook.

*Conclusions*

In view of the foregoing, it is apparent that both restricted and non-restricted subscriber substations, whether they are connected to individual or party lines, may selectively control the automatic switching apparatus to complete local calls in the central office 10. However, only non-restricted subscriber substations, whether they are connected to individual or party lines, may selectively control the automatic switching apparatus to complete trunk calls to subscriber substations in the remote exchange 20. Moreover, in the event restricted subscriber substations, whether they are connected to individual or party lines, attempt to control the automatic switching apparatus to complete trunk calls to subscriber substations in the remote exchange 20, the calls thus initiated are intercepted at the interceptor operator position 95 in the central office 10.

While there has been described what is at present considered to be the preferred embodiment of the invention, it will be understood that various modifications may be made therein; and it is intended to cover in the appended claims all such modifications as fall within the true spirit and scope of the invention.

What is claimed is:

1. In a telephone system including a first exchange provided with subscriber substations of first and second classes and automatic switching apparatus accessible thereto, each of said subscriber substations being provided with a digit transmitting mechanism, a second exchange, and a plurality of trunks extending between said exchanges and accessible to said switching apparatus; means controllable from any calling one of said subscriber substations for extending a connection therefrom to said switching apparatus, means responsive to the extension of a connection to said switching apparatus for operating it automatically to select an idle one of said trunks, means including a first relay responsive to the transmission of a digit to said switching apparatus from a calling one of said subscriber substations of said first class for repeating the digit over said one selected trunk, and means including a second relay responsive to the transmission of a digit to said switching apparatus from a calling one of said subscriber substations of said second class for reoperating said switching apparatus to release said one selected trunk.

2. In a telephone system including a first exchange provided with subscriber substations of first and second classes and automatic switching apparatus accessible thereto and an operator position accessible to said switching apparatus, each of said subscriber substations being provided with a digit transmitting mechanism, a second exchange, and a plurality of trunks extending between said exchanges and accessible to said switching apparatus; means controllable from any calling one of said subscriber substations for extending a connection therefrom to said switching apparatus, means responsive to the extension of a connection to said switching apparatus for operating it automatically to select an idle one of said trunks, means including a first relay responsive to the transmission of a digit to said switching apparatus from a calling one of said subscriber substations of said first class for repeating the digit over said one selected trunk, and means including a second relay responsive to the transmission of a digit to said switching apparatus from a calling one of said subscriber substations of said second class for reoperating said switching apparatus to release said one selected trunk and to extend the connection to said operator position.

3. In a telephone system including a first exchange provided with subscriber lines extending to subscriber substations of first and second classes and automatic switching apparatus accessible to said subscriber lines, a second exchange, and a plurality of trunks extending between said exchanges and accessible to said switching apparatus, each of said subscriber substations of said first class being provided with a conventional impulse transmitting mechanism selectively operable to transmit impulses over the connected subscriber line, each of said subscriber substations of said second class being provided with a unique impulsing transmitting mechanism selectively operable to transmit impulses over and to apply a special signal to the connected subscriber line; means controllable from any calling one of subscriber substations for extending a connection therefrom via the connected subscriber line to said switching apparatus, means responsive to the extension of a connection to said switching apparatus for operating it automatically to select an idle one of said trunks, means including a first relay normally responsive to the transmission of impulses over a subscriber line connected to said switching apparatus for repeating corresponding impulses over said one selected trunk and means including a second relay responsive to the application of said special signal to a subscriber line connected to said switching apparatus for reoperating said switching apparatus to release said one selected trunk.

4. In a telephone system including a first exchange provided with subscriber substations of first and second classes and automatic switching apparatus accessible thereto, a second exchange, and a plurality of trunks extending between said exchanges and accessible to said switching apparatus, each of said subscriber substations of said first class being provided with a conventional digit transmitting mechanism selectively operable to transmit any desired digit, each of said subscriber substations of said second class being provided with a unique digit transmitting mechanism selectively operable to transmit any desired digit and also to transmit therewith a special signal; means controllable from any calling one of said subscriber substations for extending a connection therefrom to said switching apparatus, means responsive to the extension of a connection to said switching apparatus for operating it automatically to select an idle one of said trunks, means including a first relay normally responsive to the transmission of a digit to said switching apparatus for repeating the digit over said one selected trunk, and means including a second relay responsive to the transmission of said special signal to said switching apparatus for reoperating said switching apparatus to release said one selected trunk.

5. In a telephone system including a first exchange provided with party subscriber lines extending to party subscriber substations of first and second classes and automatic switching apparatus accessible to said party subscriber lines, a second exchange, and a plurality of trunks extending between said exchanges and accessible to said switching apparatus, each of said party subscriber substations of said first class being provided with a conventional impulse transmitting mechanism selectively operable to transmit impulses over the connected party subscriber line, each of said party subscriber substations of said second class being provided with a unique impulsing transmitting mechanism selectively operable to transmit impulses over and to apply a special signal to the connected party subscriber line; means controllable from any calling one of said party subscriber substations for extending a connection therefrom via the connected party subscriber line to said switching apparatus, means responsive to the extension of a connection to said switching apparatus for operating it automatically to select an idle one of said trunks, means including a first relay normally responsive to the transmission of impulses over a party subscriber line connected to said switching apparatus for repeating corresponding impulses over said one selected trunk, and means including a second relay responsive to the application of said special signal to a party subscriber line connected to said switching apparatus for reoperating said switching apparatus to release said one selected trunk.

6. In a telephone system including a first exchange provided with a party line serving subscriber substations of first and second classes and automatic switching apparatus accessible to said party line, each of said subscriber substations being provided with a digit transmitting mechanism, a second exchange, and a plurality of trunks extending between said exchanges and accessible to said switching apparatus; means controllable from any calling one of said subscriber substations for extending a connection therefrom over said party line to said switching apparatus, means responsive to the extension of a connection to said switching apparatus for operating it automatically to select an idle one of said trunks, means including a first relay responsive to the transmission of a digit to said switching apparatus from a calling one of said subscriber substations of said first class for repeating the digit over said one selected trunk, and means including a second relay responsive to the transmission of a digit to said switching apparatus from a calling one of said subscriber substations of said second class for reoperating said switching apparatus to release said one selected trunk.

7. In a telephone system including a first exchange provided with a party line serving subscriber substations of first and second classes and automatic switching apparatus accessible to said party line and an operator position accessible to said switching apparatus, each of said subscriber substations being provided with a digit transmitting mechanism, a second exchange, and a plurality of trunks extending between said exchanges and accessible to said switching apparatus; means controllable from any calling one of said subscriber substations for extending a connection therefrom over said party line to said switching apparatus, means responsive to the extension of a connection to said switching apparatus for operating it automatically to select an idle one of said trunks, means including a first relay responsive to the transmission of a digit to said switching apparatus from a calling one of said subscriber substations of said first class for repeating the digit over said one selected trunk, and means including a second relay responsive to the transmission of a digit to said switching apparatus from a calling one of said subscriber substations of said second class for reoperating said switching apparatus to release said one selected trunk.

8. In a telephone system including a first exchange provided with a party line serving subscriber substations of first and second classes and automatic switching apparatus accessible to said party line, a second exchange, and a plurality of trunks extending between said exchanges and accessible to said switching apparatus, each of said subscriber substations of said first class being provided with a conventional digit transmitting mechanism selectively operable to transmit any desired digit, each of said subscriber substations of said second class being provided with a unique digit transmitting mechanism selectively operable to transmit any desired digit and also to transmit therewith a special signal; means controllable from any calling one of said subscriber substations for extending a connection therefrom over said party line to said switching apparatus, means responsive to the extension of a connection to said switching apparatus for operating it automatically to select an idle one of said trunks, means including a first relay normally responsive to the transmission of a digit to said switching apparatus for repeating the digit over said one selected trunk, and means including a second relay responsive to the transmission of said special signal to said switching apparatus for reoperating said switching apparatus to release said one selected trunk.

JOHN WICKS.

REFERENCES CITED

The following references are of record in the file of this patent:

UNITED STATES PATENTS

| Number | Name | Date |
|---|---|---|
| 1,256,126 | Goodrum | Feb. 12, 1918 |
| 1,649,494 | Smith | Nov. 15, 1927 |
| 2,039,668 | Stokely | May 5, 1936 |
| 2,214,213 | Voss | Sept. 10, 1940 |
| 2,217,041 | Boswau | Oct. 8, 1940 |
| 2,248,575 | Lomax | July 8, 1941 |
| 2,286,431 | Molnar et al. | June 16, 1942 |
| 2,299,514 | Taylor | Oct. 20, 1942 |
| 2,366,647 | Ostline | Jan. 2, 1945 |